UNITED STATES PATENT OFFICE.

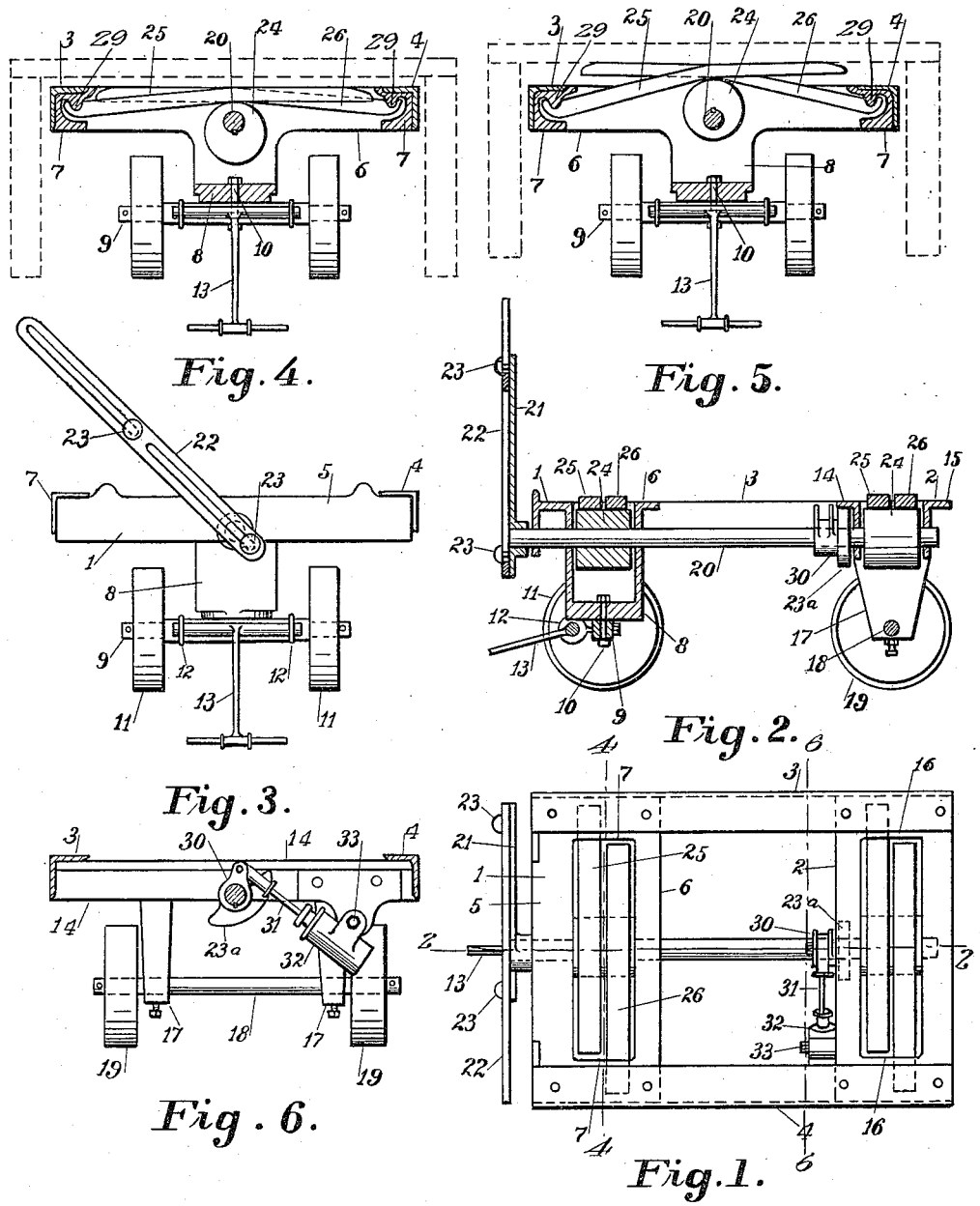

FRED HENRY ANGELL, OF COLUMBUS, OHIO.

WAREHOUSE-TRUCK.

1,175,039.

Specification of Letters Patent. Patented Mar. 14, 1916.

Application filed April 21, 1915. Serial No. 22,781.

*To all whom it may concern:*

Be it known that I, FRED HENRY ANGELL, a citizen of the United States, residing at Columbus, in the county of Franklin and State of Ohio, have invented certain new and useful Improvements in Warehouse-Trucks, of which the following is a specification, reference being had therein to the accompanying drawings.

The present invention relates to certain new and useful improvements in ware house trucks, and especially to that class of trucks which are adapted to be inserted beneath a previously arranged load, lift the load clear of the floor and transport it to any desired place where it may again be set down and the truck withdrawn.

It is a common practice in commercial establishments to provide a plurality of retablishments to provide a plurality of re-movable platforms upon which goods may be piled, which are adapted to be used in conjunction with a single truck for the transportation of the said goods from place to place. Such platforms are arranged to admit of the insertion of the truck therebeneath, and to be lifted clear of the floor by devices upon the truck.

It is the especial object of the present invention to provide improved lifting mechanism by which such platforms may be conveniently lifted by the operator, for transport from place to place.

It is a further object to provide such lifting mechanism with improved means to securely retain the load in the elevated position.

It is a further object to provide improved retarding devices in conjunction with such lifting mechanism by which the load may be gently and safely lowered to contact with the floor, thus avoiding danger to the operator or the load.

The devices by which I attain these objects are fully set forth in the following specification and illustrated in the accompanying drawings of which—

Figure 1 is a plan view of a truck embodying my invention. Fig. 2 is a longitudinal section along the line 2—2 of Fig. 1. Fig. 3 is a front elevation of the truck shown in Fig. 1. Fig. 4 is a transverse section along the line 4—4 of Fig. 1 showing the lifting fingers in their lower position. Fig. 5 is a section similar to Fig. 4 showing the lifting fingers in their elevated position. Fig. 6 is a transverse section on the line 6—6 of Fig. 1 showing the safety lowering device.

Like numerals refer to similar parts in the several figures.

In the drawings I have shown a truck having a body composed of a front frame 1 and a rear frame 2 joined by suitable angle bars 3 and 4. The front frame 1, formed preferably of cast iron, has two cross members 5 and 6 joined at their ends by the connections 7 and at the middle by the center bearing 8 which bears upon the front axle 9 to which it is connected by the pivot bolt 10. The axle 9 is provided with suitable wheels 11 and with eye bolts 12 to which the handle 13 is connected for propelling and guiding the truck. The rear frame 2 is similar to the front frame, having cross members 14 and 15 joined by the connections 16 and by the axle supporting brackets 17 to which are fixed the rear axle 18 having wheels 19.

Journaled in suitable apertures of the cross members 5, 6, 14 and 15 along the center line of the truck, is the lifting shaft 20, upon the forward end of which is fixed the lever 21 by which the shaft may be rotated. In order to increase the effective length of the lever 21 when it is desired to lift heavy loads, I have provided an extension lever 22 which is of a length approximately equal to the width of the truck frame. This extension lever 22 is provided with elongated apertures through which protrude the studs 23 of the lever 21, in such manner that when the shaft 20 is to be rotated the extension lever 22 may be slid to the position shown in Figs. 2 and 3 to afford the maximum length of lever, and at other times it may be slid to the position shown in Fig. 1 where it will be safe from possible contact with objects at either side of the truck. Rotation of the shaft 20 is limited by a cam 23 which is adapted to engage the flange of the cross member 14 for purposes which will hereinafter appear.

Fixed to the shaft 20 are two eccentrics 24 so positioned with respect to the lever 21 that when the said lever is in the horizontal position on one side of its path of rotation, the line of maximum eccentricity will be downward, and when the lever 22 is rotated to the opposite horizontal position, the line of maximum eccentricity will pass slightly beyond the vertical line, for a purpose which will presently appear. The connecting members 7 and 16 of the end frames 1 and 2 are shaped to form pockets in which are seated one end of each of the lifting fingers 25 and 26, which are disposed transversely of the truck and bear upon the eccentrics 24. A notch 29 in each of the fingers engage flanges of the frame casting to prevent the accidental displacement of the fingers. The parts described are so proportioned that when the shaft 20 is rotated to bring the eccentrics 24 to their lower position the fingers 25 and 26 will lie approximately flush with the top of the truck frame as illustrated in Fig. 4, when rotated through half a complete revolution the eccentrics, being in their upper position, will lift the free ends of the fingers as illustrated in Fig. 5, and, whatever may be upon the truck will be lifted thereby. As the eccentrics 24 are rotated slightly beyond the vertical center when the lever 21 is in the horizontal position any weight upon the lifting fingers will tend to rotate the eccentrics farther in the same direction, which rotation is prevented by the cam 23 retaining the weight in its elevated position.

Attached to the shaft 20 is a crank arm 30 pivotally connected to the plunger 31 of the dash pot 32. The dash pot 32 is attached to the frame casting 2 by a pivot bolt 33 which admits of alinement with the plunger to allow its movement with the crank arm 30. The relation of the crank arm 30 and the eccentrics 24 is such that when the eccentrics are in the upper position the plunger 31 will be at the inner end of its stroke, and when the eccentrics 24 are in their lower position the plunger 31 will be at the outer end of its stroke. The dash pot 32 is of such construction that it offers no obstruction to the ascending movement of the eccentrics while it offers a predetermined resistance to the downward motion of the eccentrics, thereby preventing the too sudden lowering of any load which may be upon the fingers. As the details of this dash pot form no part of the present invention no further description is deemed necessary at this time.

The operation of the truck is as follows: The material which is to be transported will be previously arranged upon elevated platforms indicated by dotted lines in Figs. 4 and 5, and the truck will be inserted beneath such platform. The extension lever 22 is drawn to its extreme outer position and rotated upwardly through half a revolution until the cam 23ª engages the member 14 when the lever 22 will be again pushed to its extreme inner position. When the shaft 20 is thus rotated the eccentrics 24 will elevate the fingers 25 and 26, to contact with the platform and lift it with its load clear of the floor. Upon arrival at the point where the load is to be dropped, the shaft will be rotated in the reverse direction to lower the load. The action of the dash pot 32 will retard the rotation of the cam shaft 20 in the lowering direction, thereby preventing the too sudden dropping of the load or the jerking of the lever 22 from the hand of the operator, saving the load, the truck and the operator from possible injury.

What I claim is

1. In a truck of the class described, the combination with a truck frame, of bars pivotally connected to the frame for rotation in vertical planes, eccentrics in engagement with the bars and means to rotate the eccentrics to elevate the free ends of the bars as and for the purpose set forth.

2. In a truck of the class described, the combination with a truck frame, of pairs of bars pivotally connected to the frame for rotation in vertical planes, eccentrics in engagement with the bars and means to rotate the eccentrics to elevate the free ends of the bars as and for the purpose set forth.

3. In a truck of the class described, the combination with a truck frame, of pairs of transverse bars pivotally connected to the frame for rotation in vertical planes, eccentrics in engagement with the bars and means to rotate the eccentrics to elevate the free ends of the bars as and for the purpose set forth.

4. In a truck of the class described, the combination with a truck frame, of oppositely disposed pairs of bars pivotally connected with the frame for rotation in vertical planes, eccentrics in engagement with the bars and means to rotate the eccentrics to elevate the free ends of the bars as and for the purpose set forth.

5. In a truck of the class described, the combination with a truck frame, of a plurality of oppositely disposed pairs of transverse bars pivoted for rotation in vertical planes, a shaft having eccentrics in engagement with the bars and means to rotate the shaft to elevate the free ends of the bars as and for the purpose set forth.

6. In a truck of the class described, the combination with a truck frame, of a plurality of lifting fingers arranged in pairs transversely of the truck, the opposite ends of the fingers of each pair being pivotally connected with the truck frame, a longitudinally extending shaft journaled in the frame, eccentrics on the shaft in engagement with the fingers, and means to rotate the shaft to elevate the free ends of the fingers as and for the purpose set forth.

7. In a truck of the class described, the combination with a truck frame, of lifting fingers pivotally connected with the frame, a shaft having eccentrics in engagement with the fingers, means to rotate the shaft in one direction to elevate the free ends of the fingers, and means to retard the rotation of the shaft in the opposite direction.

8. In a truck of the class described, the combination with a truck frame, of lifting fingers pivotally connected with the frame, a shaft having eccentrics in engagement with the fingers, means to rotate the shaft in one direction to elevate the free end of the fingers, and means, comprising a dash pot adapted to retard the rotation of the shaft in the opposite direction.

In testimony whereof I affix my signature.

FRED HENRY ANGELL.

Copies of this patent may be obtained for five cents each, by addressing the "Commissioner of Patents, Washington, D. C."